US007743058B2

(12) United States Patent
Liu et al.

(10) Patent No.: US 7,743,058 B2
(45) Date of Patent: Jun. 22, 2010

(54) CO-CLUSTERING OBJECTS OF HETEROGENEOUS TYPES

(75) Inventors: Tie-Yan Liu, Beijing (CN); Bin Gao, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 11/621,848

(22) Filed: Jan. 10, 2007

(65) Prior Publication Data

US 2008/0168061 A1 Jul. 10, 2008

(51) Int. Cl.
*G06F 7/00* (2006.01)
*G06F 17/30* (2006.01)
*G06F 17/00* (2006.01)
*G06N 5/00* (2006.01)

(52) U.S. Cl. .......................................... 707/737; 706/45
(58) Field of Classification Search ........................ None
See application file for complete search history.

(56) References Cited

U.S. PATENT DOCUMENTS

| | | | |
|---|---|---|---|
| 6,263,334 B1 | 7/2001 | Fayyad et al. | |
| 6,269,376 B1 | 7/2001 | Dhillon et al. | |
| 6,560,597 B1 | 5/2003 | Dhillon et al. | |
| 6,581,058 B1 | 6/2003 | Fayyad et al. | |
| 6,738,450 B1 * | 5/2004 | Barford | 378/58 |
| 6,944,607 B1 * | 9/2005 | Zhang et al. | 1/1 |
| 6,976,020 B2 | 12/2005 | Anthony et al. | |
| 7,039,638 B2 | 5/2006 | Zhang et al. | |
| 7,072,891 B2 | 7/2006 | Lee et al. | |
| 7,272,543 B2 | 9/2007 | Estevez-Schwarz et al. | |
| 7,461,073 B2 | 12/2008 | Gao et al. | |
| 2003/0069908 A1 | 4/2003 | Anthony et al. | |
| 2003/0084421 A1 | 5/2003 | Estevez-Schwarz et al. | |
| 2003/0110181 A1 * | 6/2003 | Schuetze et al. | 707/103 R |
| 2003/0154181 A1 | 8/2003 | Liu et al. | |
| 2003/0204484 A1 | 10/2003 | Charpiot et al. | |
| 2005/0015366 A1 | 1/2005 | Carrasco et al. | |
| 2005/0203889 A1 | 9/2005 | Okubo et al. | |
| 2006/0204103 A1 * | 9/2006 | Mita et al. | 382/190 |
| 2006/0242093 A1 | 10/2006 | Richardson et al. | |

(Continued)

OTHER PUBLICATIONS

U.S. Appl. No. 11/354,208, Gao et al.

(Continued)

*Primary Examiner*—Mohammad Ali
*Assistant Examiner*—Patrick A Darno
(74) *Attorney, Agent, or Firm*—Perkins Coie LLP

(57) ABSTRACT

A method and system for high-order co-clustering of objects of heterogeneous types is provided. A clustering system co-clusters objects of heterogeneous types based on joint distributions for objects of non-central types and objects of a central type. The clustering system uses an iterative approach to co-clustering the objects of the various types. The clustering system divides the co-clustering into a sub-problem, for each non-central type (e.g., first type and second type), of co-clustering objects of that non-central type and objects of the central type based on the joint distribution for that non-central type. After the co-clustering is completed, the clustering system clusters objects of the central type based on the clusters of the objects of the non-central types identified during co-clustering. The clustering system repeats the iterations until the clusters of objects of the central type converge on a solution.

17 Claims, 6 Drawing Sheets

U.S. PATENT DOCUMENTS

2007/0136286 A1* 6/2007 Webster et al. .................. 707/7
2008/0163056 A1* 7/2008 Lamadon ..................... 715/716

OTHER PUBLICATIONS

"SDP Semidefinite Programming," 2 pages, http://www-user.tuchemnitz.de/~helmberg/semidef.html [last accessed Nov. 29, 2006].

"SDPA Online Introduction," 5 pages, http://grid.r.dendai.ac.jp/sdpa/intro.html [last accessed Jan. 9, 2006].

Bach, Francis R. and Michael I. Jordan, "Learning Spectral Clustering," Neural Info. Processing Systems 16, NIPS 2003, 8 pages.

Baeza-Yates, R. and B. Ribeiro-Neto, "Chapter 2 Modeling, Modern Information Retrieval," ©1999 by the ACM Press, pp. 19-71.

Banerjee, Arindam, Inderjit Dhillon and Dharmendra S. Modha, "A Generalized. Maximum Entropy Approach to Bregman Co-clustering and Matrix Approximation," Research Track Poster, KDD'04, Aug. 22-25, 2004, Seattle, Washington, pp. 509-514, ©2004 ACM.

Benson, H.P., "Global Optimization Algorithm for the Nonlinear Sum of Ratios Problem," Journal of Optimization Theory and Applications, vol. 112, No. 1, Jan. 2002, ©2002 Plenum Publishing Corporation, pp. 1-29.

Cai, Deng et al., "Hierarchical Clustering of WWW Image Search Results Using Visual, Textual and Link Information," MM'04, New York, ©2004 ACM, 8 pages.

Cai, Deng et al., "Organizing WWW Images Based on The Analysis of Page Layout and Web Link Structure," In the 2004 IEEE International Conference on Multimedia and EXPO, ©2004 IEEE, 4 pages.

Chang, Tianhorng. and C. C. Jay Kuo, Texture Analysis and Classification with Tree-Structured Wavelet Transform, IEEE Transactions on Image Processing, vol. 2, No. 4, Oct. 1993, ©1993 IEEE, pp. 429-441.

Chen, Yixin, James Z. Wang and Robert Krovetz, "Content-Based Image Retrieval by Clustering," MIR'03, Berkeley, California, ©2003 ACM Press, pp. 193-200.

Dhillon, Indedit S., "Co-clustering documents and words using Bipartite Spectral Graph Partitioning," In KDD'01, San Francisco, California, pp. 269-274, ©2001 ACM.

Dhillon, Inderjit S., Subramanyam Mallela and Dharmendra S. Modha, "Information-Theoretic Co-clustering," SIGKDD'03, Aug. 2003, Washington, DC, pp. 89-98, ©2003 ACM.

Ding, Chris H.Q. et al., "A Min-max Cut Algorithm for Graph Partitioning and Data Clustering," Proc. IEEE Int'l Conf. Data Mining 2001, pp. 1-8.

Duda, Richard O., Peter E. Hart and David G. Stork, "Chapter 10 Unsupervised Learning and Clustering," Pattern Classification, Second Edition, ©2001 by John Wiley & Sons Inc., pp. 517-599.

Dumais, Susan T., "Chapter 4 Latent Semantic Analysis," Annual Review of Information Science and Technology (ARIST), vol. 38, Section II, Technology, 2004, pp. 189-230.

El-Yaniv, Ran and Oren Souroujon, "Iterative Double Clustering for Unsupervised and Semi-Supervised Learning," In Proceedings of ECML '101, pp. 121-132, 2001.

Freitas, Alex A., "A Critical Review of Multi-Objective Optimization in Data Mining: a position paper," SIGKDD Explorations, vol. 6, Issue 2, 2004, pp. 77-86.

Frenk, J.B.G. and S. Schaible, "Fractional Programming," Sep. 17, 2004, ERIM Report Series Reference No. ERS-2004-074-LIS, 55 pages, http://ssrn.com/abstract=595012 [last accessed Nov. 29, 2006].

Fujisawa, Katsuki et al., "Numerical Evaluation of SDPA (SemiDefinite Programming Algorithm)," Revised Sep. 1998, 29 pages.

Gao, Bin et al., "Consistent Bipartite Graph Co-Partitioning for Star-Structured High-Order Heterogeneous Data Co-Clustering," Research Track Paper, KDD'05, Chicago, © 2005 ACM, pp. 41-50.

Gao, Bin et al., "Hierarchical Taxonomy Preparation for Text Categorization Using Consistent Bipartite Spectral Graph Co-partitioning," Sep. 2005, IEEE Transactions on Knowledge and Data Engineering, vol. 17, No. 9, © 2005 IEEE, pp. 1-11.

Gao, Bin et al., "Web Image Clustering by Consistent Utilization of Visual Features and Surrounding Texts," MM'05, Nov. 6-11, 2005, Singapore, ©2005 ACM, pp. 112-121.

Golub, Gene H. and Charles F. Van Loan, "Chpts. 2.5, 7.1, 8.1 & 8.7," Matrix Computations, Johns Hopkins University Press, 3rd edition, 1996, pp. 69-75, 310-320, 393-405 and 461-469.

Gordon, Shill, Hayit Greenspan and Jacob Goldberger, "Applying the Information Bottleneck Principle to Unsupervised Clustering of Discrete and Continuous Image Representations," Proceedings of the Ninth IEEE International Conference on Computer Vision (ICCV 2003), ©2003 IEEE, 8 pages.

Hagen, Lars and Andrew B. Kahng, "New Spectral Methods for Ratio Cut Partitioning and Clustering," IEEE Transactions on Computer-Aided Design, vol. 11, Sep. 1992, ©1992 IEEE, pp. 1074-1085.

La Cascia, Marco et al., "Combining Textual and Visual Cues for Content-based Image Retrieval on the World Wide Web," IEEE Workshop on Content-based Access of Image and Video Libraries, Jun. 1998, 5 pages.

Li, Zhiwei et al., "Group WWW Image Search Results by Novel Inhomogeneous Clustering Method," In proceedings of the 11th International Multimedia Modelling Conference (MMM'05), ©2005 IEEE, 7 pages.

Long, Bo, Zhongfei (Mark) Zhang and Philip S. Yu, "Co-clustering by Block Value Decomposition," Research Track Poster, KDD'05, Aug. 21-24, 2005, Chicago, Illinois, pp. 635-640, ©2005 ACM.

Mao, Jianchang and Anil K. Jain, "Texture Classification and Segmentation Using Multiresolution Simultaneous Autoregressive Models," Jun. 20, 1991, Pattern Recognition, vol. 25, No. 2, ©1992 Pattern Recognition Society, pp. 173-188.

Pothen, Alex et al., "Partitioning Sparse Matrices with Eigenvectors of Graphs," Dec. 27, 1989, Siam J. Matrix Anal. Appl.., vol. 11, No. 3, Jul. 1990, ©1990 Society for Industrial and Applied Mathematics, pp. 430-452.

Qiu, Guoping, "Image and Feature Co-Clustering," ICPR 4, 2004, pp. 991-994.

Rodden, Kerry et al., "Does Organisation by Similarity Assist Image Browsing?," SIGCHI'01, Seattle, ©2001 ACM, 8 pages.

Shi, Jianbo and Jitendra Malik, "Normalized Cuts and Image Segmentation," Nov. 16, 1999, IEEE Transactions on Pattern Analysis and Machine Intelligence, vol. 22, No. 8, Aug. 2000, ©2000 IEEE, pp. 888-905.

Slonim, Noam and Naftali Tishby, "Document Clustering using Word Clusters via the Information Bottleneck Method," SIGIR 2000, 7/00, Athens, Greece, pp. 208-215, ©2000 ACM.

Taeprasartsit, Pinyo and Liang Guo, "Texture Analysis and Classification with Tree-Structured Wavelet Transform," May 2, 2004, CSE/EE 585 Final Project, Spring 2004, pp. 1-24.

Wang, Jidong et al., "ReCoM: Reinforcement Clustering of Multi-Type Interrelated Data Objects," SIGIR'03, Jul. 28-Aug. 1, 2003, Toronto, Canada, pp. 274-281, ©2003 ACM.

Weisstein, Eric W., "Complex Conjugate," From MathWorld—A Wolfram Web Ressource, 3 pages, http://mathworld.wolfram.com/ComplexConjugate.html [last accessed Jan. 8, 2006].

Weisstein, Eric W., "Complex Number," From MathWorld—A Wolfram Web Resource, 4 pages, http://mathworld.wolfram.com/ComplexNumber.html [last accessed Nov. 30, 2006].

Weisstein, Eric W., "Conjugate Matrix," From MathWorld—A Wolfram Web Resource, 1 page, http://mathworld.wolfram.com/ConjugateMatrix.html [last accessed Jan. 8, 2006].

Weisstein, Eric W., "Conjugate Transpose," From MathWorld—A Wolfram Web Resource, 2 pages, http://mathworld.wolfram.com/ConjugateTranspose.html [last accessed Jan. 8, 2006].

Weisstein, Eric W., "Eigenvalue," From MathWorld—A Wolfram Web Resource, 3 pages, http://mathworld.wolfram.com/Eigenvalue.html [last accessed Jan. 8, 2006].

Weisstein, Eric W., "Eigenvector," From MathWorld—A Wolfram Web Resource, 3 pages, http://mathworld.wolfram.com/Eigenvector.html [last accessed Jan. 8, 2006].

Weisstein, Eric W., "Hermitian Matrix," From MathWorld—A Wolfram Web Resource, 2 pages, http://mathworld.wolfram.com/HermitianMatrix.html [last accessed Jan. 8, 2006].

Weisstein, Eric W., "Laplacian Matrix," From MathWorld—A Wolfram Web Resource, 1 page, http://mathworld.wolfram.com/LaplacianMatrix.html [last accessed Jan. 8, 2006].

Weisstein, Eric W., "Positive Semidefinite Matrix," From MathWorld—A Wolfram Web Resource, 1 page, http://mathworld.wolfram.com/PositiveSemidefiniteMatrix.html [last accessed Jan. 8, 2006].

Weisstein, Eric W., "Self-Adjoint Matrix," From MathWorld—A Wolfram Web Resource, 1 page, http://mathworld.wolfram.com/Self-AdjointMatrix.html [last accessed Jan. 8, 2006].

Zha, Hongyuan et al., "Bipartite Graph Partitioning and Data Clustering," In proceedings of CIKM'01, Atlanta, Georgia, ©2001 ACM, pp. 25-32.

Zhao, Rong and William I. Grosky, "Narrowing the Semantic Gap—Improved Text-Based Web Document Retrieval Using Visual Features," IEEE Transactions on Multimedia, vol. 4, No. 2, Jun. 2002, ©2002 IEEE, pp. 189-200.

Sun, Jimeng et al., "Relevance Search and Anomaly Detection in Bipartite Graphs," ACM SIGKDD Explorations Newsletter, vol. 7, issue 2, Dec. 2005, pp. 48-55.

Fern, Ziaoli Zhang and Brodley, Carla E., "Solving Cluster Ensemble Problems by Bipartite Graph Partitioning," ACM International Conference on Machine Learning, Banff, Canada, ACM 2004.

* cited by examiner

CO-CLUSTERING OBJECTS OF HETEROGENEOUS TYPES

BACKGROUND

In many applications, it can be very useful to identify groups or clusters of objects such that objects in the same cluster are similar while objects in different clusters are dissimilar. Such identification of groups is referred to as "clustering." Clustering has been used extensively to identify similar web-based objects. Web-based objects may include web pages, images, scientific articles, queries, authors, news reports, and so on. For example, when a collection of images is identified by an image search engine, the search engine may want to identify clusters of related images. The search engine may use various well-known algorithms including K-means, maximum likelihood estimation, spectral clustering, and so on. These algorithms generate clusters of homogeneous objects, that is, objects of the same type (e.g., clusters of images only or clusters of web pages only).

Recently, attempts have been made to cluster highly interrelated heterogeneous objects such as images and their surrounding text; documents and terms; customers and their purchased items; articles, authors, and conferences; web users, issued queries, and click-through web pages; and so on. The goal of heterogeneous clustering is to identify clusters of each type of object that is in some way based on the clusters of the other type of object. The use of homogeneous clustering on objects of each type separately may not be an acceptable basis for heterogeneous clustering because the similarities among one type of objects sometimes can only be defined by the other type of objects. One attempt at co-clustering objects of two types tries to extend traditional spectral clustering algorithms using a bipartite spectral graph clustering algorithm to co-cluster documents and terms simultaneously. A similar attempt has been made at co-clustering heterogeneous objects in the field of biology and image processing.

Some attempts have been made at high-order co-clustering, that is, co-clustering objects of more than two data types. In the case of objects of three data types, the objects of a first type and the objects of a second type are each related to the objects of a third or central type. The relationship between objects of the first type and the objects of the central type and the relationship between objects of the second type and the objects of the central type are provided. The goal of the co-clustering is to provide a clustering of the objects of the first type, a clustering of objects of the second type, and a clustering of objects of the central type. One technique for such co-clustering is described in Gao, B., Liu, T., Zheng, X., Cheng, Q., and Ma, W., "Consistent Bipartite Graph Co-Partitioning for Star-Structured High-Order Heterogeneous Data Co-Clustering," Proc. ACM Special Interest Group on Knowledge Discovery and Data Mining (SIGKDD'05), 2005, pp. 41-50. Although this technique is very effective, it is computationally expensive, especially with large datasets.

SUMMARY

A method and system for high-order co-clustering of objects of heterogeneous types is provided. A clustering system co-clusters objects of heterogeneous types based on a first joint distribution for objects of a first type and objects of a central type and a second joint distribution for objects of a second type and objects of the central type. The clustering system uses an iterative approach to co-clustering the objects of the various types. The clustering system divides the co-clustering into a sub-problem, for each non-central type (e.g., first type and second type), of co-clustering objects of that non-central type and objects of the central type based on the joint distribution for that non-central type. Each co-clustering attempts to satisfy an objective function based on minimizing the difference or distance between the joint distribution for that non-central type and a distribution based on the clustering. After the co-clustering is completed, the clustering system clusters objects of the central type based on the clusters of the objects of the non-central types identified during co-clustering. This clustering of objects of the central type attempts to satisfy a combined objective function based on minimizing the differences between the joint distributions of the non-central types and joint distributions based on the clusters of objects of the non-central types. The clustering system repeats the iterations until the clusters of objects of the central type converge on a solution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
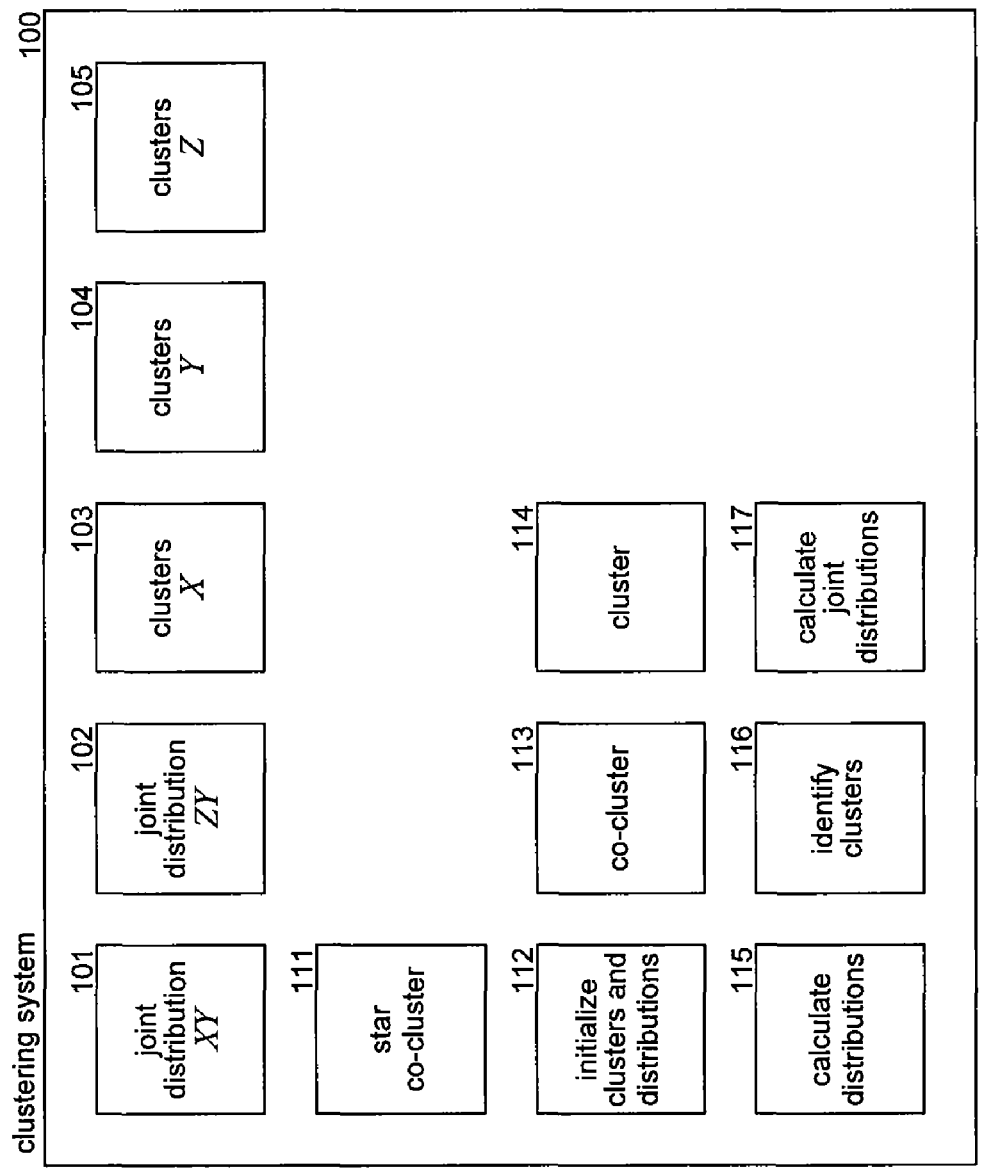
FIG. 1 is a block diagram that illustrates components of the clustering system in one embodiment.

A method and system for high-order co-clustering of objects of heterogeneous types is provided. In one embodiment, a clustering system co-clusters objects of heterogeneous types based on a first joint distribution for objects of a first type and objects of a central type and a second joint distribution for objects of a second type and objects of the central type. For example, the objects of the central type may be articles, the objects of the first type may be authors of the articles, and the objects of the second type may be conferences at which the articles were presented. A joint distribution indicates a probability-based distribution based on the relationship between objects of a non-central type and objects of the central type. The clustering system uses an iterative approach to co-clustering the objects of the various types. The clustering system divides the co-clustering into a sub-problem, for each non-central type (e.g., first type and second type), of co-clustering the objects of that non-central type and objects of the central type based on the joint distribution for that non-central type. Each co-clustering attempts to satisfy an objective function based on minimizing the difference or distance between the joint distribution for that non-central type and a distribution based on the clustering. For example, the clustering system identifies clusters of authors and clusters of articles based on the joint distribution between authors and articles, and identifies clusters of conferences and clusters of articles based on the joint distribution between conferences and articles. In one embodiment, the co-clustering of each sub-problem is performed in parallel (e.g., may be performed on different computers at the same time). After the co-clustering is completed, the clustering system clusters objects of the central type based on the clusters of the objects of the non-central types identified during co-clustering. This clustering of objects of the central type attempts to satisfy a combined objective function based on minimizing the differences between the joint distributions of the non-central types and joint distributions based on the clusters of objects of the non-central types. For example, the clustering system clusters articles based on the clusters of authors and clusters of conferences identified during the co-clustering. The clustering system iteratively performs the co-clustering (e.g., solving each sub-problem) and the clustering using the new clusters of objects of the central type identified during the previous iteration as input to the next iteration. The clustering system repeats the iterations until the clusters of objects of the central type converge on a solution. One skilled in the art will appreciate that the clustering system can be adapted to perform co-clustering of objects for orders higher than three. For example, the clustering system may co-cluster objects of four different types: a first type, a second type, a third type, and a central type. The first type, the second type, and the third type are each related to objects of the central type. For example, the clustering system may co-cluster authors, conferences, publication years, and articles with the articles being the objects of the central type. The relationship between objects of different types that is indirect through objects of a central type is referred to as a star-structured relationship.

In one embodiment, the clustering system solves the sub-problem of co-clustering of objects of a non-central type and objects of a central type by clustering objects of the non-central type based on previous clusters of objects of the central type and then clusters objects of the central type based on clusters of the objects of the non-central type. For example, the clustering system may cluster authors based on a previous clustering of articles and then re-cluster articles based on the new clusters of authors. The clustering system may start out with an initial clustering of objects of the central type, which may be randomly identified. The clustering system iteratively performs the clustering of objects of the non-central type and the clustering of objects of the central type using the clusters of objects of the central type identified during the previous iteration as input to the next iteration. The clustering system may repeat the clustering of objects of the non-central type and the clustering of objects of the central type until a termination condition is satisfied. A termination condition may be satisfied after a certain number of iterations or when the clustering converges on a solution.

The clustering system uses a probability model to represent the inter-relationship among heterogeneous objects, which is an extension of that described in Dhillon, I. S., Mallela, S., and Modha, D. S., "Information-Theoretic Co-Clustering," Proc. ACM Special Interest Group on Knowledge Discovery and Data Mining (SIGKDD'03), 2003, pp. 89-98, which is hereby incorporated by reference. The variables X, Y, and Z represent discrete random variables that correspond to objects of a first type, a central type, and a second type, respectively, with values from the sets $\{x_1, \ldots, x_m\}$, $\{y_1, \ldots, y_n\}$, and $\{z_1, \ldots, z_l\}$, respectively. The clustering system represents the joint distributions between X and Y and between Z and Y as a m×n matrix $p_1(X,Y)$ and a l×n matrix $p_2(Z,Y)$. The clustering system simultaneously clusters objects of types X, Y, and Z into r, s, and t disjoint clusters, respectively. To cluster the objects, the clustering system generates mappings from objects to clusters as represented by the following equation:

$$C_x:\{x_1,\ldots,x_m\} \to \{\hat{x}_1,\ldots,\hat{x}_r\},$$

$$C_y:\{y_1,\ldots,y_n\} \to \{\hat{y}_1,\ldots,\hat{y}_s\},$$

$$C_z:\{z_1,\ldots,z_l\} \to \{\hat{z}_1,\ldots,\hat{z}_t\}. \quad (1)$$

where CX, CY, and CZ represent the mappings and $\{\hat{x}_1,\ldots,\hat{x}_r\}$, $\{\hat{y}_1,\ldots,\hat{y}_s\}$, and $\{\hat{z}_1,\ldots,\hat{z}_t\}$ represent the clusters. The clusters may be represented by the following equations:

$$\hat{X}=C_X(X) \quad (2)$$

$$\hat{Y}=C_Y(Y) \quad (3)$$

$$\hat{Z}=C_Z(Z) \quad (4)$$

The tuple $(C_x,C_y)$ represents a co-clustering of the objects of types X and Y. The star-structured triple $(C_X,C_Y,C_Z)$ represents a co-clustering of objects of types X, Y, and Z, where the central data type is Y. The clustering system co-clusters objects based on minimizing the loss of mutual information between the mutual information of objects of two types and the mutual information of the clusters of the objects of the two types. The mutual information between objects of types X and Y is represented by the following equation:

$$I(X,Y)=\Sigma_x\Sigma_y p_1(x,y)\log(p_1(x,y)/(p_1(x)p_1(y))) \quad (5)$$

where I(X,Y) represents the mutual information and $p_1(X,Y)$ represents a joint distribution matrix. The loss of mutual information is represented by the following equation:

$$I(X,Y)-I(\hat{X},\hat{Y})=D(p_1(X,Y)\|q_1(X,Y)), \quad (6)$$

where $D(\cdot\|\cdot)$ represents the Kullback-Leibler (KL) divergence or difference, also known as relative entropy, and $q_1(X,Y)$ and $q_2(X,Y)$ represent joint distributions of the following forms:

$$q_1(x,y)=p_1(\hat{x},\hat{y})p_1(x|\hat{x})p_1(y|\hat{y}), \text{ where } x\in\hat{x}, y\in\hat{y} \quad (7)$$

$$q_2(z,y)=p_2(\hat{z},\hat{y})p_2(z|\hat{z})p_2(y|\hat{y}), \text{ where } z\in\hat{z}, y\in\hat{y} \quad (8)$$

The clustering system divides the original XYZ co-clustering problem into two sub-problems: XY co-clustering and ZY co-clustering, with the constraints that their clustering results for the central type Y are exactly the same and the overall partitioning is optimal under the objective function. In one embodiment, the clustering system uses an objective function that is a linear combination of the KL distances as represented by the following equation:

$$F(X,Y,Z)=\alpha D(p_1(X,Y)\|q_1(X,Y))+(1-\alpha)D(p_2(Z,Y)\|q_2(Z,Y)), \text{ where } 0<\alpha<1 \quad (9)$$

where F(X,Y,Z) represents the objective function and a represents a weighting factor indicating the relative confidence in XY and ZY relationships (i.e., joint distributions). The objective function can be expressed solely in terms of the row-clustering or in terms of the column-clustering. For example, in XY co-clustering, the distribution $q_1(Y|\hat{x})$ represents a row-cluster prototype, and the distribution $q_1(X|\hat{y})$ represents a column-cluster prototype. The clustering system performs the co-clustering of each sub-problem by iteratively identifying row clusters and column clusters. After performing the co-clustering for both sub-problems, the clustering system clusters the objects of the central type based on the clusters of the non-central types based on minimizing the combined objective function. The clustering system repeats the co-clustering of the sub-problems and the clustering of the objects of the central type until the clustering converges on a solution. The clustering algorithm of the clustering system is represented by the following pseudo code.

---

ALGORITHM ($p_1$, $p_2$, r, s, t, $\alpha$, &$C_X$, &$C_Y$, &$C_Z$)
Input: $p_1$: the joint distributions of X and Y; $p_2$: the joint distributions of Z and Y; r: the desired cluster number of X; s: the desired cluster number of Y; t: the desired cluster number of Z; $\alpha$: a weighting factor.
Output: The mapping functions $C_X$, $C_Y$, and $C_Z$.
1. Initialization: Set i=0. Start with some initial partition functions $C_X^{(0)}$, $C_Y^{(0)}$, and $C_Z^{(0)}$. Compute $q_1^{(0)}(\hat{X},\hat{Y})$, $q_1^{(0)}(X|\hat{X})$, $q_1^{(0)}(Y|\hat{Y})$
$q_2^{(0)}(\hat{Z},\hat{Y})$, $q_2^{(0)}(Z|\hat{Z})$, $q_2^{(0)}(Y|\hat{Y})$ and distributions $q_1^{(0)}(Y|\hat{x})$, $1 \leq \hat{x} \leq r$ and $q_2^{(0)}(Y|\hat{z})$, $1 \leq \hat{z} \leq t$ using $q_1^{(i)}(y|\hat{x}) = q_1^{(i)}(y|\hat{y}) \, q_1^{(i)}(\hat{y}|\hat{x})$,
$q_2^{(i)}(y|\hat{z}) = q_2^{(i)}(y|\hat{y}) \, q_2^{(i)}(\hat{y}|\hat{z})$.
2. Compute X clusters. For each x, find its new cluster index as
$C_X^{(i+1)}(x) = \arg\min_{\hat{x}} D(p_1(Y|x) || q_1^{(i)}(Y|\hat{x}))$, resolving ties arbitrarily. Let $C_Y^{(i+1)} = C_Y^{(i)}$.
3. Compute distributions $q_1^{(i+1)}(\hat{X},\hat{Y})$, $q_1^{(i+1)}(X|\hat{X})$, $q_1^{(i+1)}(Y|\hat{Y})$ and the distributions $q_1^{(i+1)}(X|\hat{y})$, $1 \leq \hat{y} \leq s$ using $q_1^{(i+1)}(x|\hat{y}) = q_1^{(i+1)}(x|\hat{x}) q_1^{(i+1)}(\hat{x}|\hat{y})$.
4. Compute Y clusters. For each y, find its new cluster index as
$C_Y^{(i+2)}(y) = \arg\min_{\hat{y}} p_1(X|y) || q_1^{(i+1)}(X|\hat{y}))$, resolving ties arbitrarily. Let $C_X^{(i+2)} = C_X^{(i+1)}$.
5. Compute distributions $q_1^{(i+1)}(\hat{X},\hat{Y})$, $q_1^{(i+2)}(X|\hat{X})$, $q_1^{(i+2)}(Y|\hat{Y})$ and the distributions $q_1^{(i+2)}(Y|\hat{x})$, $1 \leq \hat{x} \leq r$ using $q_1^{(i)}(y|\hat{x}) = q_1^{(i)}(y|\hat{y}) q_1^{(i)}(\hat{y}|\hat{x})$.
6. If the number of the process loop of Steps 2~5 exceeds the scheduled value, or the change in objective function value of the X-Y sub-problem, that is, $D(p_1(X,Y) || q_1^{(i)}(X,Y)) - D(p_1(X,Y) || q_1^{(i+2)}(X,Y))$, is small, go to Step 7; otherwise, go to Step 2.
7. Compute Z clusters. For each z, find its new cluster index as
$C_Z^{(i+1)}(z) = \arg\min_{\hat{z}} D(p_2(Y|z) || q_2^{(i)}(Y|\hat{z}))$, resolving ties arbitrarily. Let $C_Y^{(i+1)} = C_Y^{(i)}$.
8. Compute distributions $q_2^{(i+1)}(\hat{Z},\hat{Y})$, $q_2^{(i+1)}(Z|\hat{Z})$, $q_2^{(i+1)}(Y|\hat{Y})$ and the distributions $q_2^{(i+1)}(Z|\hat{y})$, $1 \leq \hat{y} \leq n$ using $q_2^{(i+1)}(z|\hat{y}) = q_2^{(i+1)}(z|\hat{z}) q_2^{(i+1)}(\hat{z}|\hat{y})$.
9. Compute Y clusters. For each y, find its new cluster index as
$C_Y^{(i+2)}(y) = \arg\min_{\hat{y}} D(p_2(Z|y) || q_2^{(i+1)}(Z|\hat{y}))$, resolving ties arbitrarily. Let $C_Z^{(i+2)} = C_Z^{(i+1)}$.
10. Compute distributions $q_2^{(i+2)}(\hat{Z},\hat{Y})$, $q_2^{(i+2)}(Z|\hat{Z})$, $q_2^{(i+2)}(Y|\hat{Y})$ and the distributions $q_2^{(i+2)}(Y|\hat{z})$, $1 \leq \hat{z} \leq t$ using $q_2^{(i)}(y|\hat{z}) = q_2^{(i)}(y|\hat{y}) q_2^{(i)}(\hat{y}|\hat{z})$.
11. If the number of the process loop of Steps 7~10 exceeds the scheduled value, or the change in objective function value of the Z-Y sub-problem, that is, $D(p_2(Z,Y) || q_2^{(i)}(Z,Y)) - D(p_2(Z,Y) || q_2^{(i+2)}(Z,Y))$, is small, go to Step 12; otherwise, go to Step 7.
12. Compute Y clusters under the concept of consistency. For each y, find its new cluster index as
$C_Y^{(i+2)}(y) = \arg\min_{\hat{y}}$
$[\alpha p_1(y) D(p_1(X|y) || q_1^{(i+1)}(X|\hat{y})) + (1-\alpha) p_2(y) D(p_2(Z|y) || q_2^{(i+1)}(Z|\hat{y}))]$
resolving ties arbitrarily ($0 < \alpha < 1$). Let $C_X^{(i+2)} = C_X^{(i+1)}$ and $C_Z^{(i+2)} = C_Z^{(i+1)}$.
13. Compute distributions $q_1^{(i+2)}(\hat{X},\hat{Y})$, $q_1^{(i+2)}(X|\hat{X})$, $q_1^{(i+2)}(Y|\hat{Y})$,
$q_2^{(i+2)}(\hat{Z},\hat{Y})$, $q_2^{(i+2)}(Z|\hat{Z})$, $q_2^{(i+2)}(Y|\hat{Y})$, and distributions
$q_1^{(i+2)}(Y|\hat{x})$, $1 \leq \hat{x} \leq r$ and $q_2^{(i+2)}(Y|\hat{z})$, $1 \leq \hat{z} \leq t$ using
$q_1^{(i)}(y|\hat{x}) = q_1^{(i)}(y|\hat{y}) q_1^{(i)}(\hat{y}|\hat{x})$, $q_2^{(i)}(y|\hat{z}) = q_2^{(i)}(y|\hat{y}) q_2^{(i)}(\hat{y}|\hat{z})$.
14. Stop and return $C_X = C_X^{(i+2)}$, $C_Y = C_Y^{(i+2)}$, and $C_Z = C_Z^{(i+2)}$ if the change in objective function value, that is,
$\alpha[D(p_1(X,Y) || q_1^{(i)}(X,Y)) - D(p_1(X,Y) || q_1^{(i+2)}(X,Y))] +$
$(1-\alpha)[D(p_2(Z,Y) || q_2^{(i)}(Z,Y)) - D(p_2(Z,Y) || q_2^{(i+2)}(Z,Y))]$, where
$0 < \alpha < 1$, is small; else, set i=i+2 and go to Step 2.

---

In step 1, the algorithm starts with an initial co-clustering and computes the marginal distributions of the resultant approximations $q_1^{(0)}$ and $q_2^{(0)}$. In steps 2-6, the algorithm solves the XY sub-problem by iteratively identifying clusters for X and then clusters for Y. In step 2, the algorithm reassigns each object of type X to a new cluster whose $q_1^{(i)}(Y|\hat{x})$ is closest to $p_1(Y|x)$ in Kullback-Leibler distance. Thus, the algorithm identifies a new clustering of X without changing the clustering of Y. In step 3, the algorithm recomputes the marginal distributions of $q_1^{(i+1)}$ using the new clustering of X and the old clustering of Y. In step 4, the algorithm reassigns each object of type Y to a new cluster whose $q_1^{(i)}(X|\hat{y})$ is closest to $p_1(X|y)$ in Kullback-Leibler distance. Thus, the algorithm identifies a new clustering of Y without changing the clustering of X. In step 5, the algorithm recomputes the marginal distributions of $q_1^{(i+2)}$ using the new clustering of X and Y. The algorithm repeats steps 2-6 until the number of iterations exceeds a predefined value or the change in the objective function of the XY sub-problem is small enough (i.e., converges on a solution). In steps 7-11, the algorithm solves the ZY sub-problems in a manner similar to the solving of the XY sub-problem. In step 12, the algorithm reassigns objects of type Y to new clusters without changing the clustering of objects of types X and Z. In step 13, the algorithm updates the marginal distributions of $q_1^{(i+2)}$ and $q_2^{(i+2)}$ using the new clustering of objects of types X, Y, and Z. In step 14, the algorithm determines whether the solution converges on a solution as indicated by convergence of the objective function. If the solution has not converged, the algorithm continues at step 2 to perform another iteration of the algorithm.

FIG. 1 is a block diagram that illustrates components of the clustering system in one embodiment. The clustering system 100 includes a joint distribution XY store 101 and a joint distribution ZY store 102. The joint distribution XY store contains the joint distribution for objects of types X and Y. The joint distribution ZY store contains the joint distribution for objects of types Z and Y. The clustering system also includes a clusters X store 103, a clusters Y store 104, and a clusters Z store 105. The clusters stores contain the clusters of objects identified by the clustering system. The clustering system includes a star co-cluster component 111, an initialize clusters and distributions component 112, a co-cluster component 113, a cluster component 114, a calculate distributions component 115, an identify clusters component 116, and a calculate joint distributions component 117. The star co-cluster component implements the overall clustering algorithm. The star co-cluster component invokes the initialize clusters and distributions component to generate the initial clusters and distributions. The star co-cluster component invokes the co-cluster component to solve the sub-problems and the cluster component to cluster objects of type Y based on the clusters of objects of types X and Z generated by solving the sub-problems. The initialize clusters and distributions component invokes the calculate distributions component to calculate the initial distributions. The co-cluster component invokes the identify clusters component and the calculate joint distributions component to identify clusters and recalculate joint distributions based on the identified clusters.

The computing devices on which the clustering system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the clustering system. In addition, the data structures and message structures may be stored or transmitted via a data transmission medium, such as a signal on a communications link. Various communications links may be used, such as the Internet, a local area network, a wide area network, or a point-to-point dial-up connection, to connect the clustering system to other devices (e.g., web servers).

The clustering system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
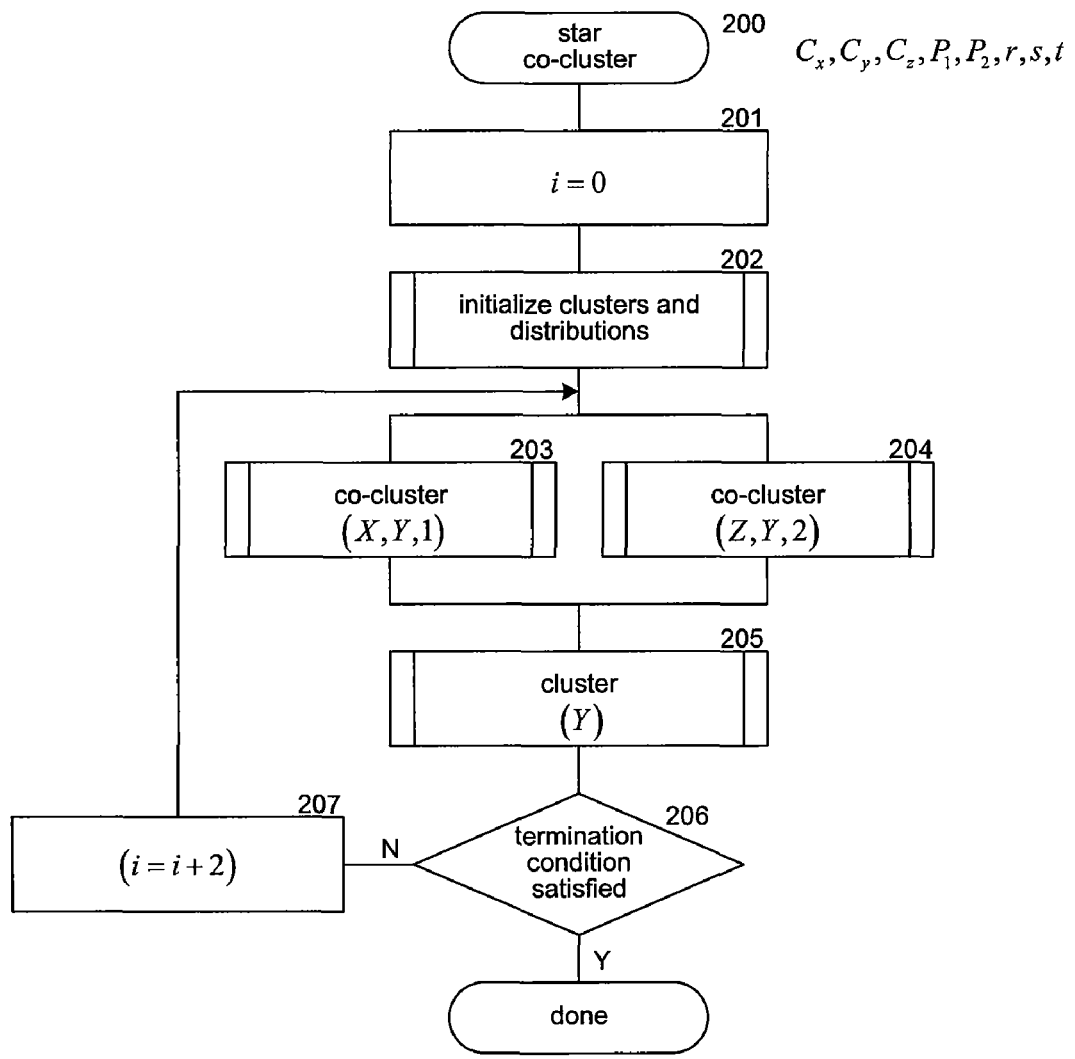
FIG. 2 is a flow diagram that illustrates the processing of the star co-cluster component of the clustering system in one embodiment.

FIG. 2 is a flow diagram that illustrates the processing of the star co-cluster component of the clustering system in one embodiment. The component 200 implements the co-clustering algorithm of the clustering system. The component is provided with the joint distributions for the objects along with an indication of the number of clusters for each type of object. In block 201, the component initializes an indexing variable. In block 202, the component invokes the initialize clusters and distributions component to create an initial clustering and calculate the corresponding distributions. In blocks 203-207, the component loops performing the iterations of the algorithm. In blocks 203 and 204, the component invokes the co-clustering component to solve the XY sub-problem and the ZY sub-problem. The sub-problems may be solved in parallel. In block 205, after solving each sub-problem, the clustering system invokes the cluster component. In decision block 206, if a termination condition is satisfied, then the component completes, else the component continues at block 207. In block 207, the component increments the indexing variable and loops to blocks 203 and 204 to perform the next iteration of the algorithm.

Figure 3:
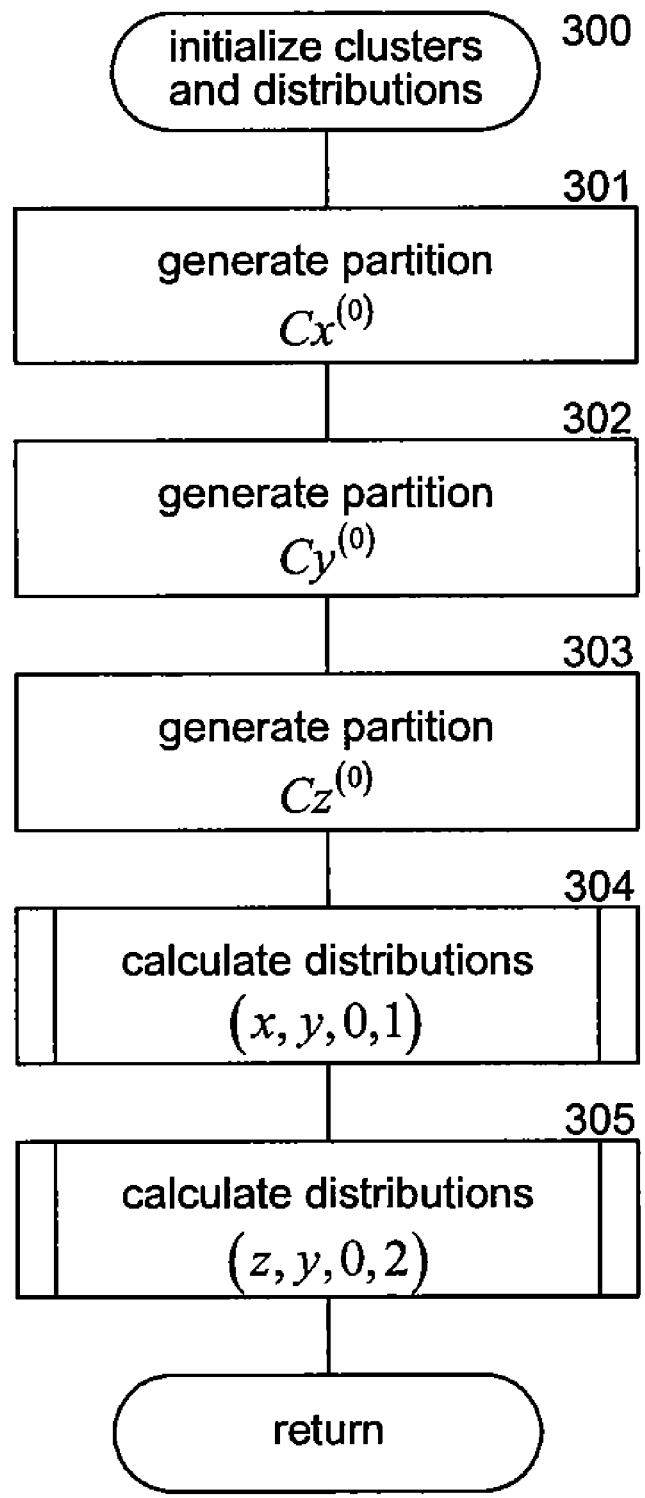
FIG. 3 is a flow diagram that illustrates the processing of the initialize clusters and distributions component of the clustering system in one embodiment.

FIG. 3 is a flow diagram that illustrates the processing of the initialize clusters and distributions component of the clustering system in one embodiment. The component 300 generates clusters (e.g., randomly) of the objects and calculates the corresponding distributions. In block 301, the component generates clusters for the objects of type X. In block 302, the component generates clusters for objects of type Y. In block 303, the component generates clusters for objects of type Z. In block 304, the component invokes the calculate distributions component to calculate the initial distributions for the objects of types X and Y based on the initial clustering. In block 305, the component invokes the calculate distributions component to calculate the initial distributions for the objects of types Z and Y based on the initial clustering. The component then returns.

Figure 4:
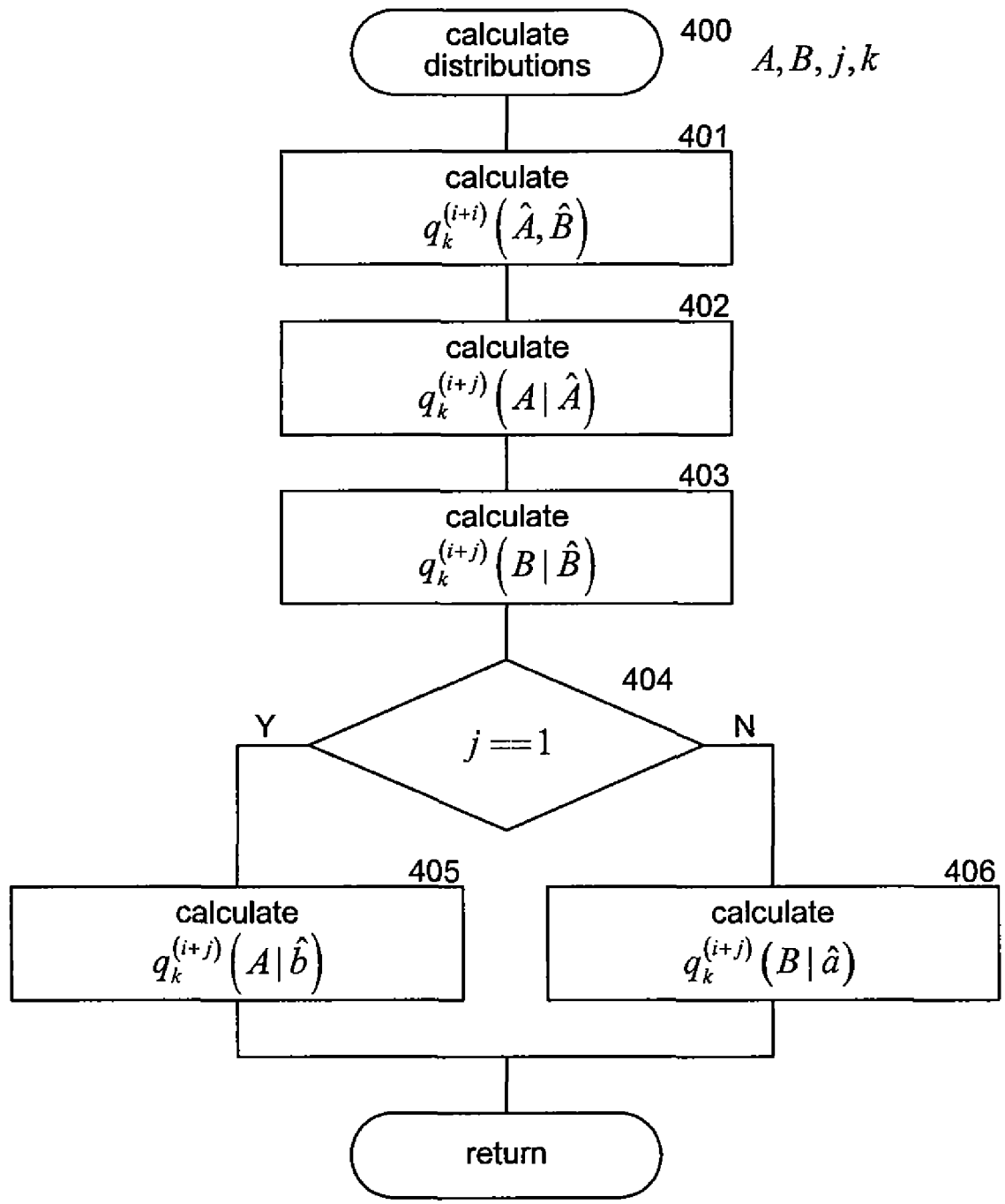
FIG. 4 is a flow diagram that illustrates the processing of the calculate distributions component of the clustering system in one embodiment.

FIG. 4 is a flow diagram that illustrates the processing of the calculate distributions component of the clustering system in one embodiment. The component 400 is passed an indication of two types of objects A and B (B being the central type), an index j indicating whether the distribution is being calculated based on a clustering of a non-central type (i.e., 1) or the central type (i.e., 2), and an index k indicating whether the XY sub-problem (i.e., 1) or the ZY sub-problem (i.e., 2) is being solved. The variables A and B represent formal parameters that are replaced by actual parameters when the component is invoked. In blocks 401-403, the component calculates various joint distributions. In decision block 404, if the component is invoked for co-clustering based on a non-central type, then the component continues at block 405, else the component continues at block 406. In block 405, the component calculates a joint probability based on the clustering of objects of the non-central type. In block 406, the component calculates a joint probability based on the clustering of objects of the central type. The component then returns.

Figure 5:
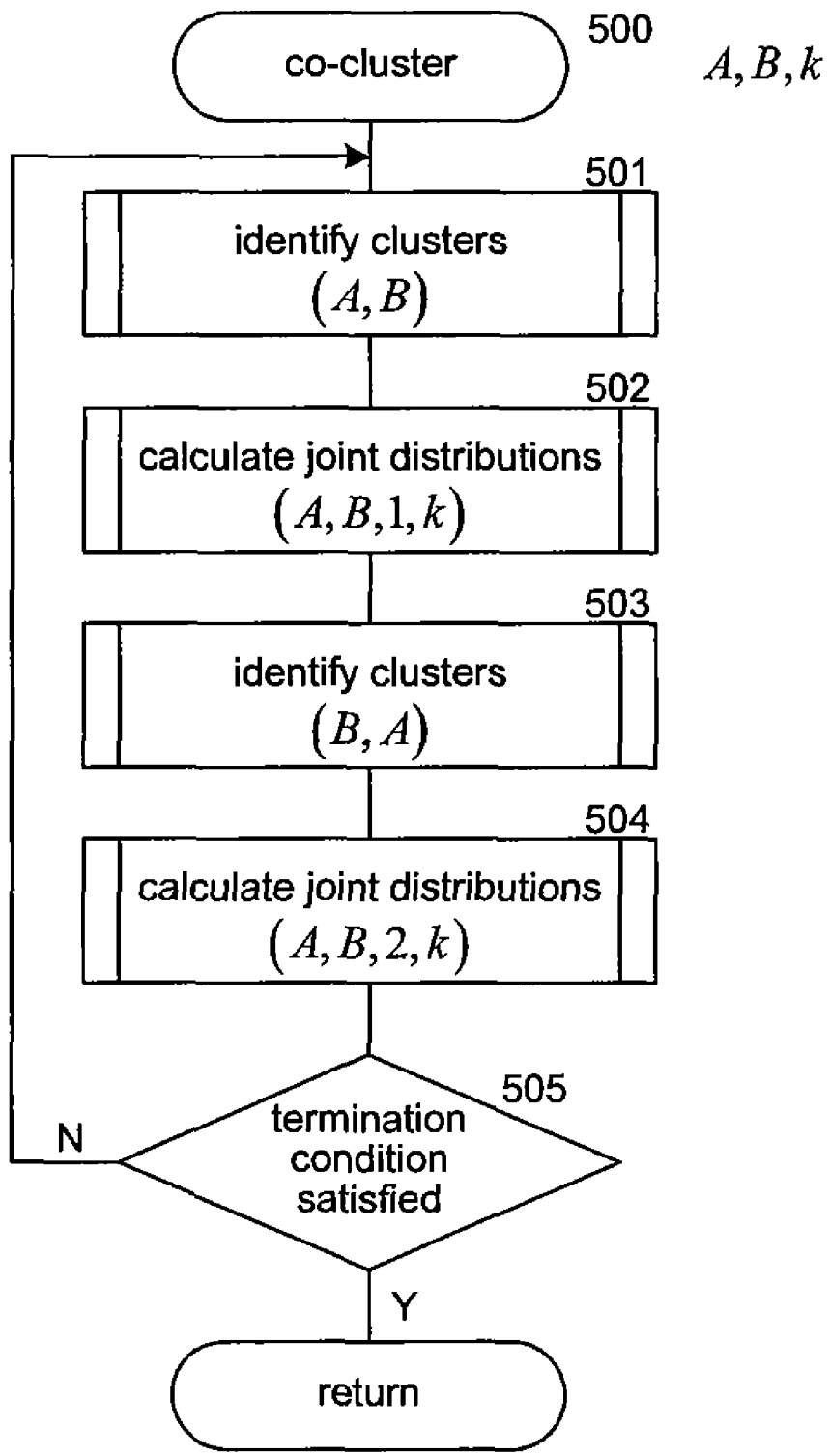
FIG. 5 is a flow diagram that illustrates the processing of the co-cluster component of the clustering system in one embodiment.

FIG. 5 is a flow diagram that illustrates the processing of the co-cluster component of the clustering system in one embodiment. The component 500 solves a sub-problem for the objects of types A and B. In blocks 501-505, the component loops performing the iterations of the sub-problem until a termination condition is satisfied. In block 501, the component invokes the identify clusters component to identify clusters for objects of type A. In block 502, the component invokes the calculate joint distributions component to calculate joint distributions based on the new clusters of objects of type A. In block 503, the component invokes the identify clusters component to identify clusters of objects of type B. In block 504, the component invokes the calculate joint distributions component to calculate joint distributions based on the new clusters of objects of type B. In decision block 505, if a termination condition is satisfied for the sub-problem, then the component returns, else the component continues at block 501 to perform the next iteration.

Figure 6:
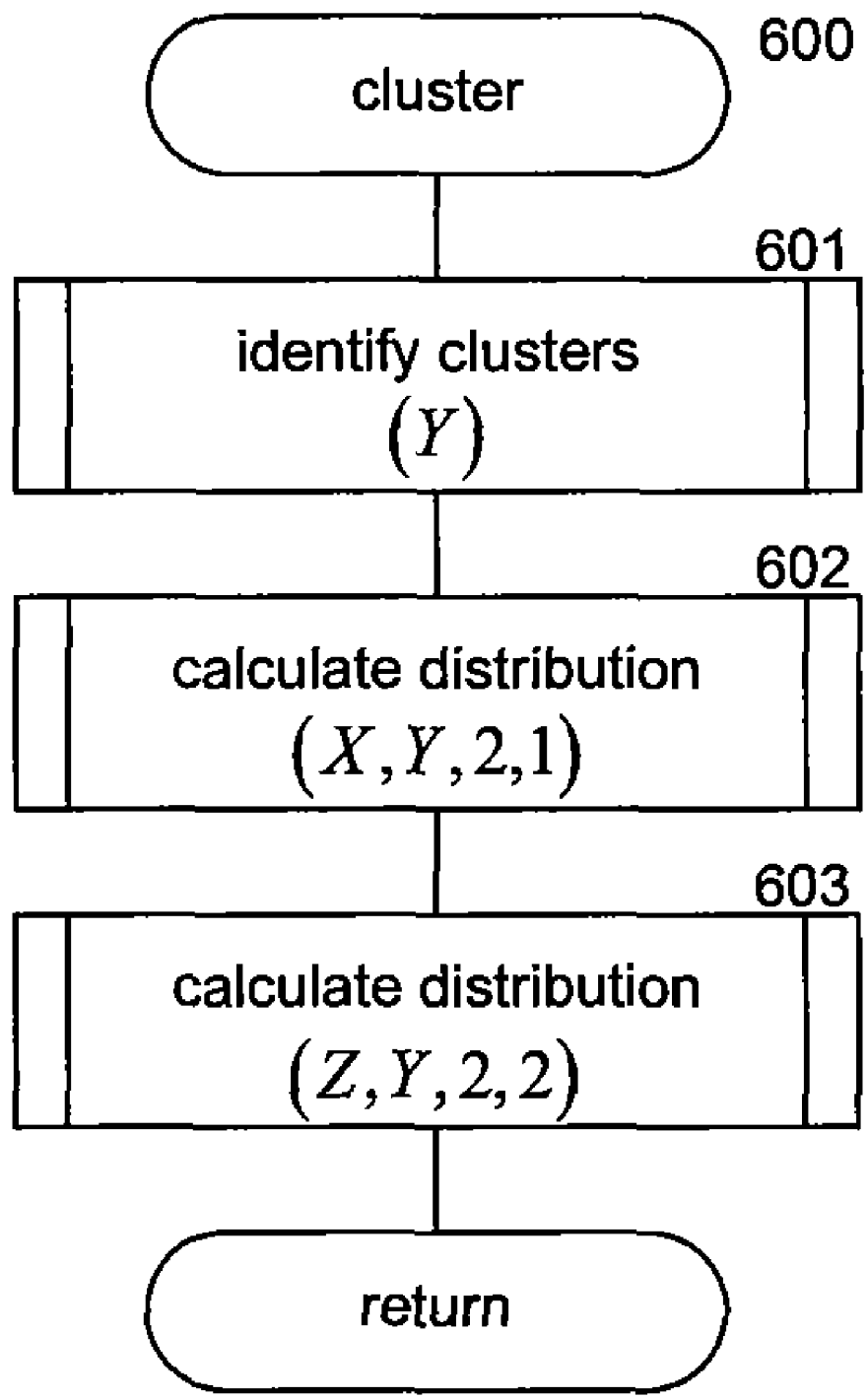
FIG. 6 is a flow diagram that illustrates the processing of the cluster component of the clustering system in one embodiment.

FIG. 6 is a flow diagram that illustrates the processing of the cluster component of the clustering system in one embodiment. The component 600 identifies clusters of objects of the central type based on the clusters of objects of the non-central types identified in the solutions to the sub-problems. In block 601, the component invokes the identify clusters component to identify the clusters of the objects of the central type. In block 602, the component invokes the calculate distributions component to calculate the distributions for the objects of types X and Y. In block 603, the component invokes the calculate distributions component to calculate the distributions for objects of types Z and Y. The component then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing system for co-clustering of objects of heterogeneous types that include objects of a first type, objects of a second type, and objects of a central type, comprising:
   a memory storing computer-executable instructions for
      a component that receives a first joint distribution for objects of the first type and objects of the central type and a second joint distribution for objects of the second type and objects of the central type, the first joint distribution indicating a joint probability of objects of the first type and objects of the central type as rows and columns of a first probability matrix, the second joint distribution indicating a joint probability of objects of the second type and objects of the central type as rows and columns of a second probability matrix;
      a component that co-clusters objects of the first type and objects of the central type into clusters of objects of the first type and clusters of objects of the central type to minimize a difference between the first joint distribution and a distribution based on the clusters of objects of the first type and clusters of objects of the central type, wherein the difference is based on loss of mutual information between objects of the first type and objects of the central type and mutual information of object clusters of objects of the first type and objects of the central type;
      a component that co-clusters objects of the second type and objects of the central type into clusters of objects of the second type and clusters of objects of the central type to minimize a difference between the second joint distribution and a distribution based on the clusters of objects of the second type and clusters of objects of the central type, wherein the difference is based on loss of mutual information between objects of the second type and objects of the central type and mutual information of object clusters of objects of the second type and objects of the central type; and
      a component that clusters objects of the central type based on the clusters of the objects of the first type and clusters of the objects of the second type; and
   a processor that executes the computer-executable instructions stored in the memory.

2. The computing system of claim 1 wherein each component that co-clusters inputs clusters of objects of the central type, clusters objects of the non-central type based on the clusters of objects of the central type, and clusters objects of the central type based on the clusters of the objects of the non-central type.

3. The computing system of claim 2 wherein the clustering of objects of the non-central type and the clustering of objects of the central type are repeated until a termination condition is satisfied.

4. The computing system of claim 3 wherein the termination condition is a fixed number of repetitions.

5. The computing system of claim 3 wherein the termination condition is the clustering converging on a solution.

6. The computing system of claim 1 wherein the co-clustering and clustering are repeated until a termination condition is satisfied.

7. The computing system of claim 6 wherein the termination condition is the clustering of the central objects converging on a solution.

8. The computing system of claim 1
   wherein the component that clusters objects of the central type generates clusters based on minimizing a difference between the first joint distribution and a joint distribution based on the clustering and a difference between the second joint distribution and a joint distribution based on the clustering; and
   wherein the co-clustering and clustering are repeated until a termination condition relating to the clustering of objects of the central type is satisfied.

9. The computing system of claim 1 wherein the components that co-cluster operate in parallel.

10. A method performed by a computing system for co-clustering of objects of heterogeneous types that include objects of a first type, objects of a second type, and objects of a central type, the method comprising:
    receiving a first joint distribution for objects of the first type and objects of the central type and a second joint distribution for objects of the second type and objects of the central type, the first joint distribution indicating a joint probability of objects of the first type and objects of the central type as rows and columns of a first probability matrix, the second joint distribution indicating a joint probability of objects of the second type and objects of the central type as rows and columns of a second probability matrix;
    co-clustering by the computing system objects of the first type and objects of the central type into clusters of objects of the first type and clusters of objects of the central type to minimize a difference between the first joint distribution and a distribution based on the clusters of objects of the first type and clusters of objects of the central type, wherein the difference is based on loss of mutual information between objects of the first type and objects of the central type and mutual information of object clusters of objects of the first type and objects of the central type;
    co-clustering by the computing system objects of the second type and objects of the central type into clusters of objects of the second type and clusters of objects of the central type to minimize a difference between the second joint distribution and a distribution based on the clusters of objects of the second type and clusters of objects of the central type, wherein the difference is based on loss of mutual information between objects of the second type and objects of the central type and mutual information of object clusters of objects of the second type and objects of the central type; and
    clustering by the computing system objects of the central type based on the clusters of the objects of the first type and clusters of objects of the second type.

11. The method of claim 10 wherein the co-clustering inputs clusters of objects of the central type, clusters objects of the non-central type based on the clusters of objects of the central type, and clusters objects of the central type based on the clusters of the objects of the non-central type.

12. The method of claim 11 wherein the clustering of objects of the non-central type and the clustering of objects of the central type are repeated until a termination condition is satisfied.

13. The method of claim 12 wherein the termination condition is a fixed number of repetitions.

14. The method of claim 12 wherein the termination condition is the clustering converging on a solution.

15. A computer-readable medium storing computer-executable instructions for controlling a computing system to co-cluster objects of heterogeneous types that include objects of a first type, objects of a second type, and objects of a central type, by a method comprising:

receiving a first joint distribution for objects of the first type and objects of the central type and a second joint distribution for objects of the second type and objects of the central type, the first joint distribution indicating a joint probability of objects of the first type and objects of the central type as rows and columns of a first probability matrix, the second joint distribution indicating a joint probability of objects of the second type and objects of the central type as rows and columns of a second probability matrix;

co-clustering by the computing system objects of the first type and objects of the central type into clusters of objects of the first type and clusters of objects of the central type to minimize a difference between the first joint distribution and a distribution based on the clusters of objects of the first type and clusters of objects of the central type, wherein the difference is based on loss of mutual information between objects of the first type and objects of the central type and mutual information of object clusters of objects of the first type and objects of the central type;

co-clustering by the computing system objects of the second type and objects of the central type into clusters of objects of the second type and clusters of objects of the central type to minimize a difference between the second joint distribution and a distribution based on the clusters of objects of the second type and clusters of objects of the central type, wherein the difference is based on loss of mutual information between objects of the second type and objects of the central type and mutual information of object clusters of objects of the second type and objects of the central type; and clustering by the computing system objects of the central type based on the clusters of the objects of the first type and clusters of the objects of the second type.

16. The computer-readable medium of claim 15 wherein the co-clustering inputs clusters of objects of the central type, clusters objects of the non-central type based on the clusters of objects of the central type, and clusters objects of the central type based on the clusters of the objects of the non-central type.

17. The computer-readable medium of claim 15 wherein the co-clusterings operate in parallel.

* * * * *